US008462355B2

(12) United States Patent
Vucinic et al.

(10) Patent No.: US 8,462,355 B2
(45) Date of Patent: Jun. 11, 2013

(54) 3D SCANNING ACOUSTO-OPTIC MICROSCOPE

(75) Inventors: Dejan Vucinic, San Diego, CA (US); Terrence J. Sejnowski, Solana Beach, CA (US)

(73) Assignee: The Salk Institute for Biological Studies, La Jolla, CA (US)

( * ) Notice: Subject to any disclaimer, the term of this patent is extended or adjusted under 35 U.S.C. 154(b) by 0 days.

(21) Appl. No.: 12/812,226

(22) PCT Filed: Jan. 15, 2009

(86) PCT No.: PCT/US2009/031122
§ 371 (c)(1),
(2), (4) Date: Jul. 8, 2010

(87) PCT Pub. No.: WO2009/091902
PCT Pub. Date: Jul. 23, 2009

(65) Prior Publication Data
US 2010/0284024 A1 Nov. 11, 2010

Related U.S. Application Data

(60) Provisional application No. 61/021,828, filed on Jan. 17, 2008.

(51) Int. Cl.
*G01B 11/24* (2006.01)
*G01N 21/86* (2006.01)
*G02B 21/00* (2006.01)

(52) U.S. Cl.
USPC ...... 356/602; 356/607; 356/608; 250/559.19; 250/459.1; 359/368

(58) Field of Classification Search
USPC .. 356/601–630, 317–319, 492, 445; 359/368, 359/370, 371, 386, 389; 250/459.1, 461.1, 250/458.1, 559.19
See application file for complete search history.

(56) References Cited

U.S. PATENT DOCUMENTS

| | | | | |
|---|---|---|---|---|
| 4,744,663 A * | 5/1988 | Hamashima et al. | ......... | 356/615 |
| 4,962,312 A * | 10/1990 | Matuura et al. | ............... | 250/236 |
| 4,969,730 A | 11/1990 | Van Den Brandt | | |
| 5,408,322 A * | 4/1995 | Hsu et al. | ...................... | 356/369 |
| 5,526,165 A | 6/1996 | Toda et al. | | |
| 5,563,702 A * | 10/1996 | Emery et al. | ..................... | 356/73 |
| 5,578,818 A * | 11/1996 | Kain et al. | .................... | 250/234 |
| 5,936,728 A * | 8/1999 | Bouzid | ......................... | 356/318 |
| 6,100,991 A * | 8/2000 | Challener | ..................... | 356/445 |
| 6,185,036 B1 * | 2/2001 | Tanaami | ....................... | 359/368 |

(Continued)

OTHER PUBLICATIONS

International Search Report and Written Opinion of the International Searching Authority, mailed Mar. 11, 2009, for corresponding International Application No. PCT/US2009/031122.

*Primary Examiner* — Sang Nguyen
(74) *Attorney, Agent, or Firm* — Klarquist Sparkman, LLP

(57) ABSTRACT

A scanning microscope includes an acousto-optic scanner that produces a scanned beam. A beam separator based on total internal reflection or angle tuning of a dielectric filter separates an unscanned portion of an excitation light flux from a scanned portion. The scanned beam is directed to a specimen, and optical radiation generated in response to the scanned beam is directed to a detector that produces a detected signal that can be used to determine an image. The scanned beam can be directed to the specimen without formation of any intermediate focusing.

26 Claims, 10 Drawing Sheets

U.S. PATENT DOCUMENTS

| | | |
|---|---|---|
| 6,549,292 B1 * | 4/2003 | Schmidt et al. ............... 356/630 |
| 6,636,301 B1 * | 10/2003 | Kvamme et al. ........... 356/237.2 |
| 6,750,457 B2 * | 6/2004 | Heffelfinger et al. ...... 250/458.1 |
| 6,958,858 B2 * | 10/2005 | Engelhardt et al. ........... 359/388 |
| 7,016,087 B2 * | 3/2006 | Heffelfinger et al. ......... 358/474 |
| 7,199,882 B2 | 4/2007 | Svetkoff et al. |
| 7,245,412 B2 * | 7/2007 | Bruland et al. ............ 359/225.1 |
| 7,919,328 B2 * | 4/2011 | Dejneka et al. ............... 436/172 |
| 2002/0067490 A1 * | 6/2002 | Okawauchi .................... 356/614 |
| 2005/0111089 A1 * | 5/2005 | Baer .............................. 359/368 |
| 2006/0011860 A1 * | 1/2006 | Hecht et al. ................. 250/459.1 |
| 2007/0153368 A1 | 7/2007 | Vucinic et al. |
| 2007/0263226 A1 * | 11/2007 | Kurtz et al. .................... 356/492 |

* cited by examiner

3D SCANNING ACOUSTO-OPTIC MICROSCOPE

CROSS REFERENCE TO RELATED APPLICATIONS

This is the U.S. National Stage of International Application No. PCT/US2009/031122, filed Jan. 15, 2009, which was published in English under PCT Article 21(2), which in turn claims the benefit of U.S. Provisional Application No. 61/021,828, filed Jan. 17, 2008. Both applications are incorporated herein by reference.

FIELD

The disclosure pertains to laser scanning microscopy.

BACKGROUND

Microscopic techniques based on optical radiation or particle beams are standard tools in research and clinical laboratories. The development of sophisticated microscope methodologies such as confocal microscopy and multi-photon microscopy permit analyses beyond those available with conventional imaging microscopy. Unfortunately, application of many of these advanced methods to clinical or even routine research laboratory use is impractical due to the size, cost, and time required to perform such analyses. While some have attempted to make practical instruments, these efforts are typically attempts to miniaturize conventional systems and are therefore constrained by conventional instrument geometries. While such miniaturized instruments can be more practical than typical laboratory instruments, they remain large, complex, and require operator sophistication.

Application of multi-photon microscopy to recording neuronal activity is described in Vucinic and Sejnowski, "A Compact Multiphoton 3D Imaging System for Recording Fast Neuronal Activity," PLoS ONE, vol. 2, e699, Aug. 8, 2007. The use of confocal microscopy for detection of skin cancer is described in Daukantas, "Using Optics to Detect Skin Cancer," Optics and Photonics News, November 2007, pages 28-33. Representative microscopes are further described in, for example, Denk et al., U.S. Pat. No. 5,034,613 and Sasaki et al., U.S. Pat. No. 7,180,661, both of which are incorporated herein by reference.

Microscopy systems that include acousto-optic or electro-optic scanners generally include complex optical systems that focus and refocus an excitation beam prior to delivery to a specimen. In addition, scanner-based systems tend to have unscanned beam portions that may not contribute to specimen evaluation, and can be associated with specimen damage, particularly for systems using high power, short pulse length lasers. Thus, while the methods and apparatus described in the above references demonstrate the applicability of sophisticated microscopy techniques to practical specimen measurements, further advances are needed.

SUMMARY

According to some examples, apparatus comprise a beam scanner configured to receive an excitation optical beam and produce at least a scanned optical beam that is angularly deflected with respect to the excitation optical beam. The scanned optical beam is directed to a beam selector and a focusing element is situated to receive the scanned beam from the beam selector and converge the scanned beam at a predetermined specimen location. In representative examples, a detector is configured to receive emitted optical radiation from the specimen produced in response to the scanned beam. In some examples, the beam selector is configured to substantially divert an unscanned portion of the excitation optical beam so that the unscanned portion does not reach the specimen. In other examples, the beam selector includes an optical surface situated so that the scanned optical beam is incident to the optical surface at an angle greater than or equal to a critical angle and an unscanned portion of the excitation optical beam is incident to the optical surface at an angle less than the critical angle. In alternative embodiments, the beam selector includes an optical surface situated so that the scanned optical beam is incident to the optical surface at an angle less than a critical angle and an unscanned portion of the excitation optical beam is incident at an angle of incidence greater than or equal to a critical angle. In some examples, the beam selector comprises first and second right angle prisms situated so as to form a beam splitter having an air gap between the first and second prisms so as to define the optical surface.

In further representative examples, the beam selector includes a dielectric filter situated so that the scanned optical beam is substantially transmitted by the dielectric filter to the focusing element along an optical axis and an unscanned portion of the excitation optical beam is substantially diverted by the dielectric filter from the optical axis. In some examples, the beam selector includes a dielectric filter situated so that the scanned optical beam is substantially reflected by the dielectric filter to the focusing element and the unscanned portion of the excitation optical beam is substantially transmitted by the dielectric filter. In some examples, the dielectric filter is a notch filter or an edge filter.

In some illustrative examples, the beam scanner is an acousto-optic scanner. In other examples, the scanned beam is afocally delivered to the specimen. In some embodiments, the detector is configured to receive emitted optical radiation from the specimen in a wavelength range that is different than a wavelength range associated with the excitation optical radiation or in a wavelength range that partially or completely overlaps a wavelength range of the excitation optical radiation. In additional examples, a scanner driver is coupled to the beam scanner and configured to provide an electrical signal to the beam scanner so as to angularly deflect the scanned beam in a range of scan angles. The beam selector can be situated so as to substantially transmit the scanned beam and divert an unscanned portion of the excitation beam. In typical examples, the beam scanner is configured to produce an angularly scanned beam that is scanned along at least two non-parallel axes.

Scanning microscopes comprise a beam scanner configured to receive an excitation optical flux and produce a scanned optical beam, wherein the scanned beam is scanned along at least one axis. An objective lens is configured to direct the scanned optical beam to a specimen, and a detector is configured to receive responsive optical radiation produced at the specimen in a wavelength range different than or the same as that of the excitation optical flux. A display controller is configured to provide an image representation based on an electrical signal received from the detector that is responsive to the received optical radiation in the different wavelength range. The image representation can be an image data file or a displayed image. In some examples, the detector is an array detector. In other examples, a scanner mount such as a lens tube or other unitary mounting hardware is configured to retain the beam scanner and the objective lens. In other examples, the objective lens is a microscope objective and the scanner mount includes a threaded portion configured for attachment of the microscope objective. In further examples, a beam selector is configured to direct the scanned beam to the objective lens and substantially divert an unscanned portion of the excitation optical beam from the objective lens. In some examples, the beam separator is also secured to the scanner mount. In other representative examples, the beam selector includes an optical interface situated so that the scanned beam and the unscanned portion of the excitation beam are separated by total internal reflection. In other examples, the beam selector includes a dielectric filter situated so as to separate the scanned beam and the unscanned portion of the excitation beam based on angles of incidence of the scanned beam and the unscanned portion of the excitation beam.

Methods comprise producing a scanned beam from an excitation optical beam and afocally separating the scanned beam and an unscanned portion of the excitation optical beam. The scanned beam is delivered to a specimen and an image signal is produced based on optical radiation emitted in response to the scanned beam. In some examples, the scanned beam and the unscanned portion are separated at an optical interface via total internal reflection, or based on a wavelength shift of a dielectric filter associated with an angle of incidence of the scanned beam or the unscanned portion, The foregoing and other objects, features, and advantages of the technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises."

The described systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods which function in the manner described by such theories of operation. Some disclosed embodiments direct or focus a scanned excitation beam to a specimen without intermediate focusing. Such systems are referred to herein as afocal. In addition, some disclosed embodiments include beam separators based on differences in reflectivity associated with even small angular deviations associated with beam scanning. Surprisingly, such differences permit realization of total internal reflection based beam separators or angle tuned dielectric filter based beam separators, but the disclosure is not limited to such separators.

Figure 1:
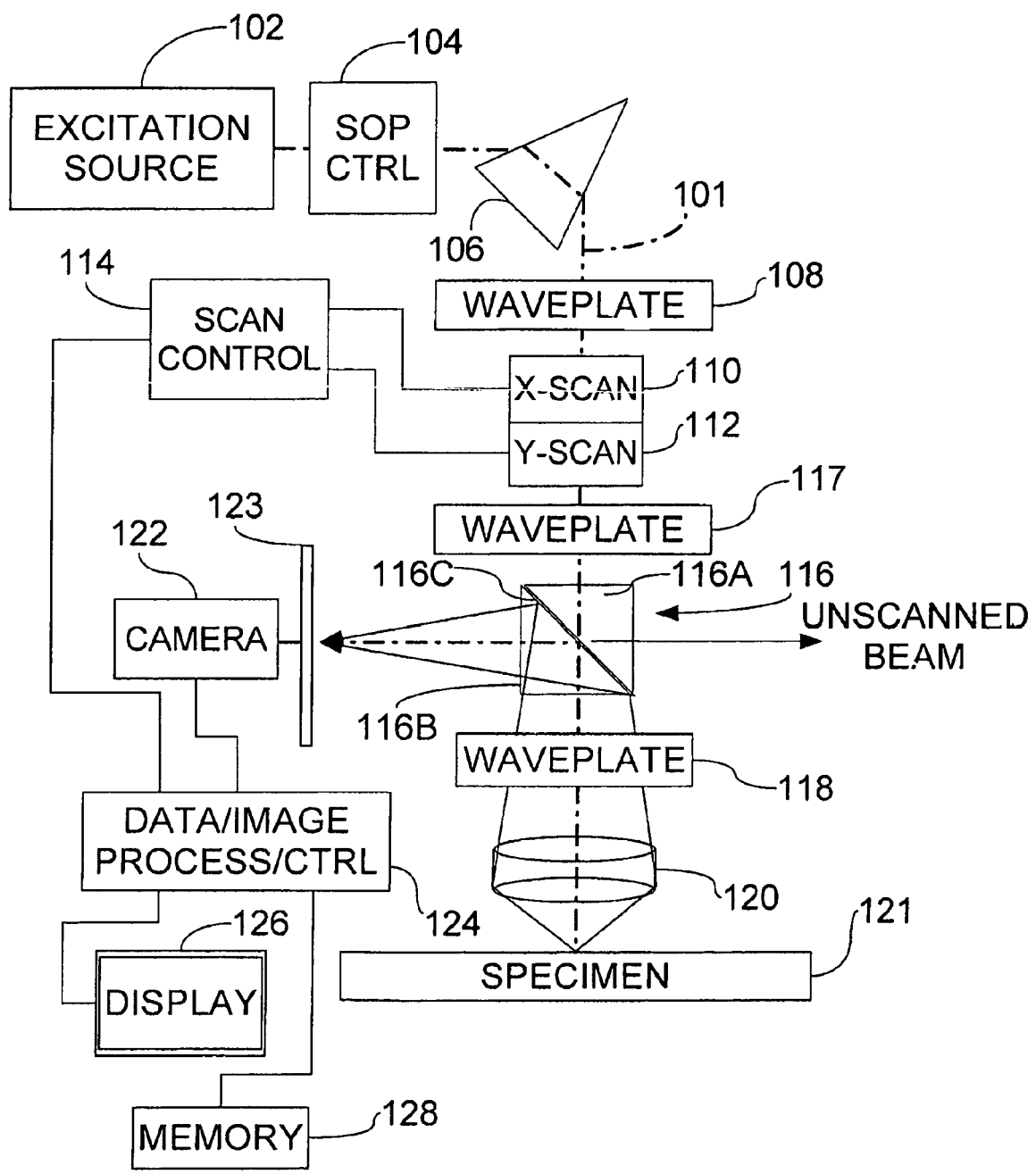
FIG. 1 is a schematic diagram of a representative laser scanning microscope in which scanned beam is transmitted to a specimen and an unscanned portion of an excitation beam is reflected away from the specimen.

With reference to FIG. 1, a representative apparatus includes an excitation source 102 that provides optical radiation that is selected to produce single or multi-photon fluorescence or other optical radiation in response thereto. The excitation source 102 is typically a laser source that is configured to provide optical radiation at a selected wavelength. Laser sources having narrowband emission are usually superior, and the laser can be selected to provide peak pulse powers, average powers, pulse durations, and pulse repetition rates as may be convenient for a particular application. In some examples, pulse durations of less than 100, 10, or 1 ps or less than 100, 50, and 10 fs are used. Radiation from laser or other sources having wavelengths in a range of about 100 nm to about 10 μm is referred to herein as optical radiation, but the methods and apparatus disclosed and claimed are not limited to such radiation.

Optical radiation from the source 102 is directed along an optical axis 101 to a state of polarization (SOP) control device 104 such as one or more polarizers and/or retardation plates to conform the SOP of the excitation radiation to a desired SOP. In some applications, the SOP device 104 is not used. Optical radiation from the source 102 is conveniently produced in an excitation beam of a suitable cross-section, and beam forming optics (not shown) in FIG. 1 can be provided to shape the excitation beam as may be convenient. A dispersion compensation (or pre-compensation) prism 106 is provided to direct the excitation beam to a retardation plate 108 and an X-scanner 110 and a Y-scanner 112. If dispersion compensation is not intended, one or more mirrors can be used instead of the prism 106, and as is understood by those of skill in the art, such turning elements effectively fold the optical axis 101. In some embodiments, turning optics are unnecessary. The prism 106 can be selected to compensate dispersion in acousto-optic deflection angles due to Bragg angle dependence on optical wavelength. Such a prism can be situated so that substantially all spectral portions of an input optical flux are deflected along a common axis. In addition, the prism 106 can be situated so as to reduce or eliminate temporal dispersion. See, for example, Zeng et al., "Simultaneous compensation for spatial and temporal dispersion of acousto-optical deflectors for two-dimensional scanning with a single prism," Opt. Lett. 31:1091-1093 (Apr. 15, 2006) that is incorporated herein by reference.

The X-scanner 110 and the Y-scanner 112 are coupled to a scan controller 114 that provides a scan control signal based on radio-frequency or other electrical signals selected to produce a scanned excitation beam. The scanners 110, 112 are conveniently acousto-optic scanners and the electrical signals supplied to these scanners are generally at frequencies in a range of about 5 MHz to 10 GHz. The electrical signal frequencies and powers are selected in combination with orientations of the scanners 110, 112 to produce the scanned beam so as to propagate at an angle $\theta_{SCAN}$ with respect to the axis 101, wherein $\theta_{SCAN}$ is a function of the frequencies of the applied radio frequency signals. In addition, the scanners 110, 112 are generally not 100% efficient, and a portion of the input excitation beam continues to propagate along or nearly along the optical axis 101 as an unscanned beam. In the example of FIG. 1, X- and Y-scanners are used to produce a two dimensional scan along orthogonal axes, but other one or two dimensional scan configurations are possible. Generally, the scanners 110, 112 and the electrical signals supplied to the scanners 110, 112 are configured to permit directing the scanned beam across a selected region of interest of a specimen 121.

The scanners 110, 112 are conveniently implemented as acousto-optic scanners made of materials such as $TeO_2$ or other acousto-optic materials. As shown in FIG. 1, separate scanners are provided for X- and Y-scans, but in other examples a single scanner based on, for example, a single portion of an acousto-optic material can be configured to provide two dimensional scanning. Some representative materials include $HgCl_2$, GaP, $LiNbO_3$ as well as other anisotropic or isotropic materials. In some examples, scanning produces a scanned beam having a different state of polarization (SOP) than the input beam. If the scanned excitation beam has a particular SOP, a retardation plate may be used to obtain a preferred SOP for excitation. For example, optical component reflectance and transmittance are generally different for s- and p-polarizations, and an appropriate polarization can be select to enhance or suppress reflectance or transmittance.

The scanned beam is directed to a beam separator 116, shown in FIG. 1 as a cube beam splitter consisting of right angle prisms 116A, 116B separated by an air gap 116C. A waveplate 117 can be provided so that the scanned beam is p-polarized as incident to the air gap 116 so as to increase the transmission of the scanned beam to the specimen 121. The beam separator 116 is situated with respect to the unscanned beam so that the unscanned beam is substantially reflected by total internal reflection at an interface between the prism 116A and the air gap 116C. The scanned beam is incident to the interface at a different angle and is substantially transmitted to a waveplate 118 and an objective lens 120. In some examples, the waveplate 118 can be a quarter-wave retarder oriented so that the scanned beam is circularly polarized at the specimen 121 so as to reduce or eliminate polarization dependent shading produced by, for example, cell membrane bound fluorophores. Typically, the beam separator is configured so that at least about 10%, 25%, 50%, 75%, or 90% of the scanned beam is transmitted and less than about 25%, 10%, 1%, 0.1%, or 0.01% of the unscanned beam is transmitted. The scanned beam is focused or otherwise shaped and is then scanned over a region of interest on the specimen 121 by the objective lens 120.

Single or multi-photon based optical radiation (referred to herein as fluorescence) produced at the specimen 121 in response to the scanned beam is collected, in part, by the objective lens 120 and directed through the waveplate 118 and reflected by the beam separator 116. The fluorescence can be directed through one or more filters such as filter 123 that is configured to attenuate radiation at wavelengths other than those associated with the fluorescence, such as, for example, wavelengths associated with the scanned beam or background optical radiation. The filter 123 is typically a multilayer dielectric filter but in some examples absorptive, diffractive, or polarization based filters, acousto-optic tunable filters, or combinations of such filters can be used. In other examples, scattered, reflected, or other portions of an incident optical beam can be collected to produce images or other specimen assessments.

As shown in FIG. 1, a camera 122 is coupled to receive the fluorescence and produce an electrical signal associated with detected fluorescence that is delivered to a processor 124. The processor 124 is also coupled to the scan controller 114, and can produce an image or other representation of a region of interest of the specimen 121 based on the scan control signal and a detected fluorescence signal from the camera 122. In some examples, the camera 122 produces a suitable image, and the scan control signal is not needed to compute an image. In other examples, a single detector or a linear array of detectors can be used instead of a camera. Using such detectors, an image can be produced based on the scan control signal (i.e., information concerning a current location of the excitation beam at the region of interest) and a photoelectric signal produced by the detector. Typically an image is generated by or received at the processor 124 and presented on a display 126, and fluorescence data, image data, or other information is stored in a memory 128. In addition, the memory can be configured to store computer executable instructions for acquisition of such data, including camera and scan control instructions. The processor 124 can be conveniently implemented with a personal computer, a work station, a palm top or hand held computer, or similar device. Memory can be provided as RAM, ROM, one or more hard disks, floppy disks, CD, DVD, or other computer readable media, and combinations thereof. Instructions can be received and stored locally or communicated via remote storage over a network (not shown in FIG. 1), and data and images can be similarly communicated.

Figure 2:
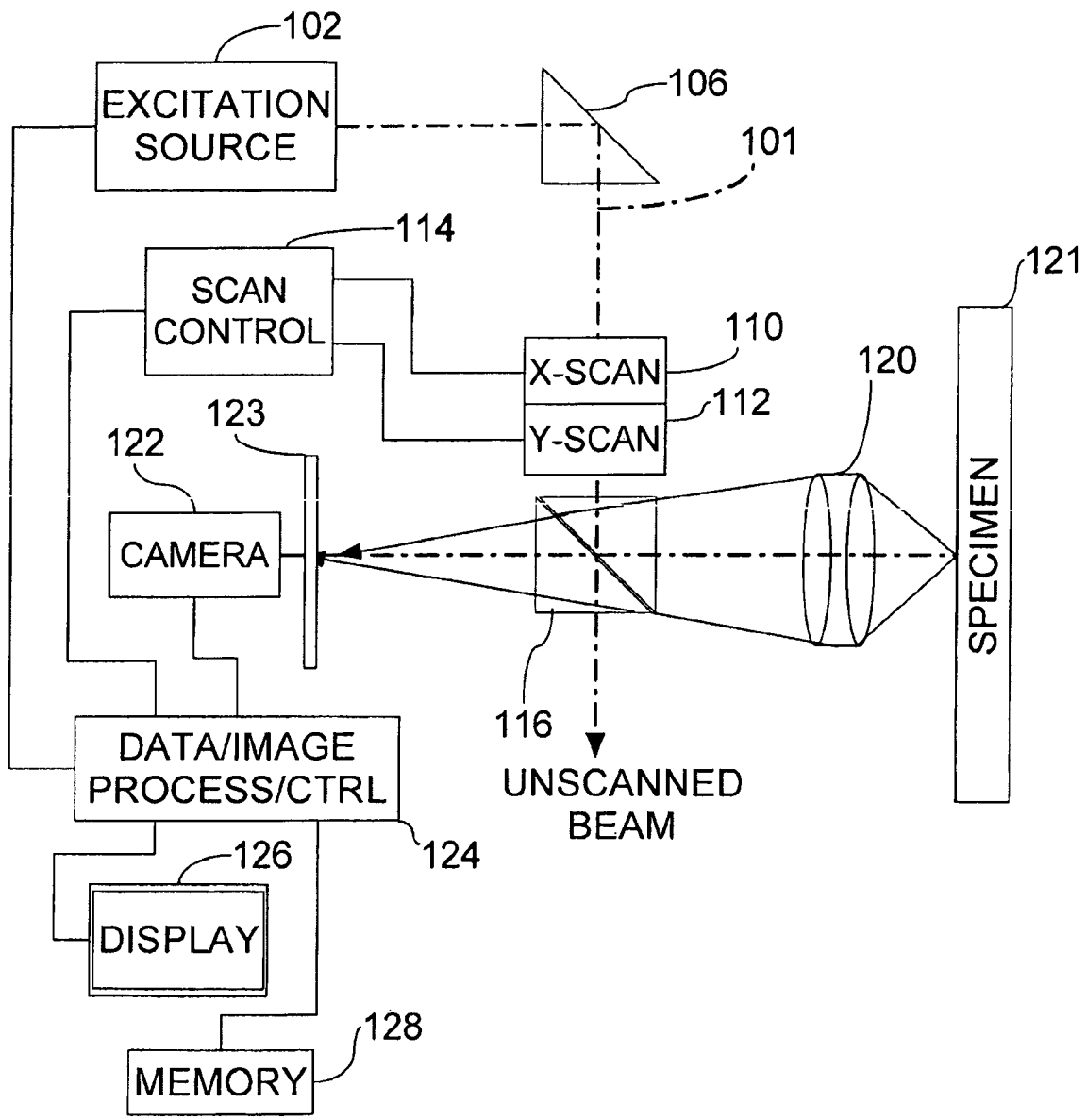
FIG. 2 is a schematic diagram of a representative laser scanning microscope in which a scanned beam is reflected to a specimen.

In the example of FIG. 1, the scanned beam is substantially transmitted and the unscanned beam is substantially reflected by the beam separator 116. In other examples, the scanned beam is reflected and the unscanned beam is transmitted as shown in FIG. 2. While either the configuration of FIG. 1 or FIG. 2 can be used, the configuration of FIG. 1 typically provides less transmission of the unscanned optical beam to the specimen 121, and may be preferred for applications in which exposure of the specimen to an intense laser beam is to be avoided. For example, in multi-photon applications, an unscanned excitation beam portion can produce damage in a specimen. Total internal reflection can provide effective attenuation optical densities of at least between about 1 and 7, and therefore can provide substantial reductions in unscanned beam power at the specimen 121.

Figure 3:
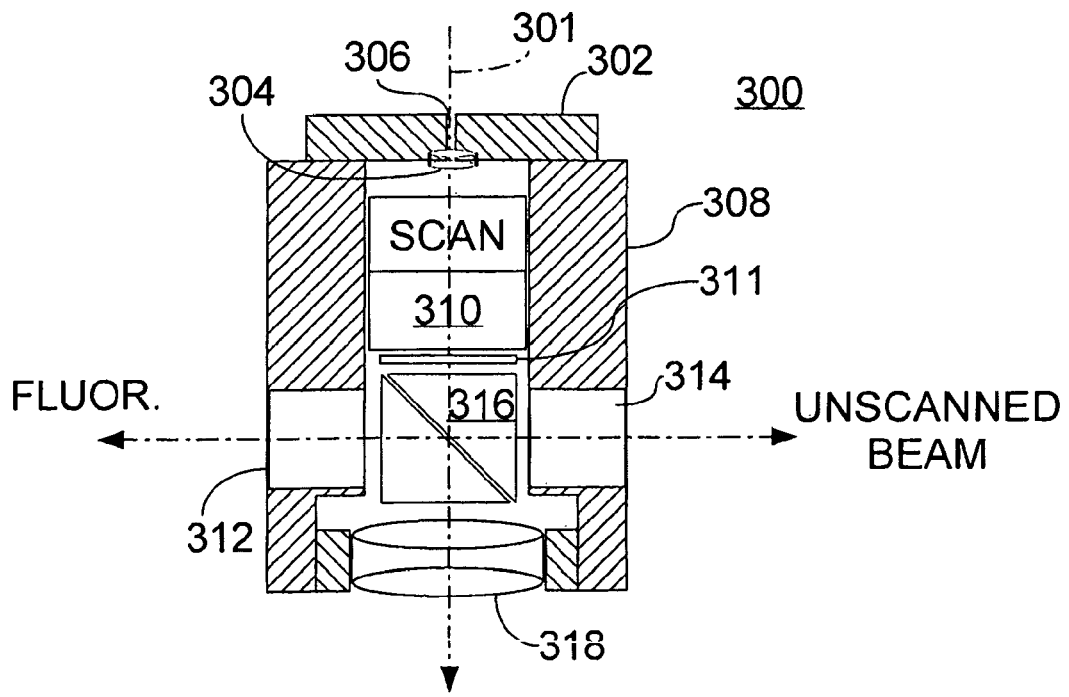
FIG. 3 is a sectional view of a representative scanning head for a scanning microscope.

With reference to FIG. 3, a unitary scanning microscope assembly 300 includes an optical fiber coupling 302 in which an aperture 306 is defined so as to receive and secure an optical fiber. In some examples, an optical fiber connector can be secured to the coupling 302 so as to retain the optical fiber. The aperture 306 or other connection can be defined so as to receive and orient various fiber types such as polarizing and polarization retaining fibers. The optical fiber coupling 302 permits convenient and flexible delivery of excitation optical radiation to a specimen via an optical fiber. Alternatively, a laser diode or other source can be secured to the coupling 302 so that fiber connection is not needed. The fiber coupling 302 also includes a collimating or beam shaping lens or lens assembly 304 that is situated to form a suitable optical beam and direct the optical beam along an axis 301. A mounting assembly 308 such as a lens barrel or other hardware is configured to retain a beam scanner 310, a beam separator 316, an objective lens assembly 318, and the optical fiber coupling 302. A waveplate 311 can be included, and is typically selected so that the scanned beam incident to an air gap of the beam separator 316 is p-polarized. Other electrical or optical components such as retardation plates, optical filters, polarizers, electrical connectors, and scanner drive circuit components such as tuning coils can also be secured to the mounting assembly. As shown in FIG. 3, the mounting assembly 308 defines apertures 312, 314 that are situated to receive optical radiation associated with specimen fluorescence and to permit the unscanned beam to exit for capture as desired, respectively.

Figure 4:
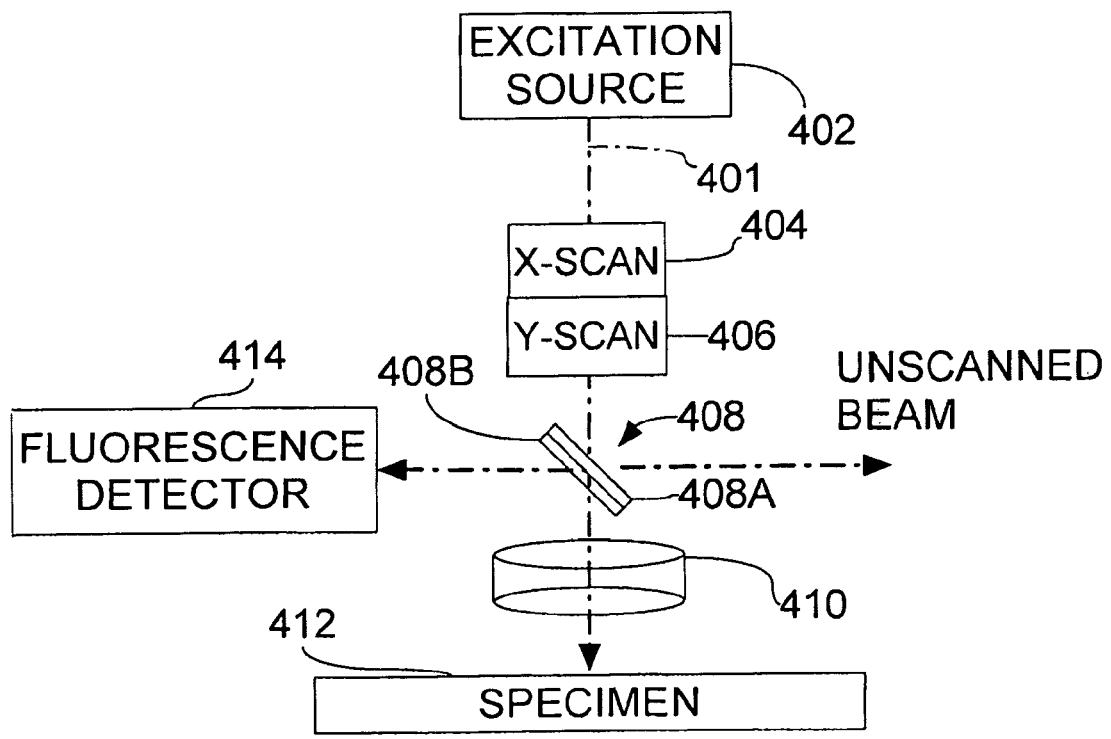
FIGS. 4-5 are schematic views of scanning microscopes in which an angularly tuned multilayer dielectric filter serves as a beam separator.

In another example illustrated in FIG. 4, an excitation source 402 that is configured to produce optical radiation at wavelengths, peak powers, and other parameters suitable for inducing single or multi-photon fluorescence in a specimen 412 is situated so produce an excitation beam that is directed along an axis 401 to beam scanners 404, 406. The beam scanners 404, 406 are coupled to a scan driver and produce a scanned or deflected optical beam that is transmitted by the beam separator 408 while the unscanned beam is reflected by the beam separator.

The beam separator 408 includes a multilayer or other coating 408A situated on a substrate 408B. The substrate 408A is transparent to the excitation beam and can be glass, fused silica, quartz, or other isotropic or anisotropic materials. In the example of FIG. 4, the multilayer coating 408B is selected to transmit the scanned beam and reflect the unscanned beam based on their respective angles of incidence. Suitable filters can be obtained from, for example, SEMROCK, Buffalo, N.Y.

Figure 6:
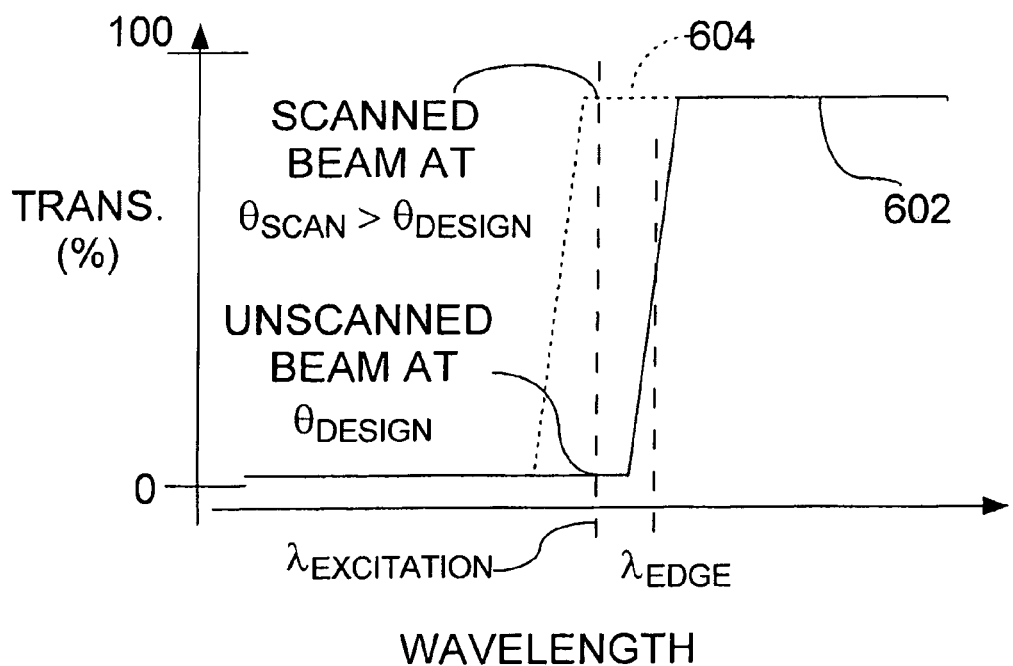
FIG. 6 is a graph of transmission as a function of wavelength for a long wavelength edge pass filter.

A transmission spectrum of a suitable filter is illustrated in FIG. 6. In this example, the beam separator 408 is based on a long wavelength pass edge filter having an edge wavelength $\lambda_{EDGE}$ at which the transmission of the edge filter is about 50% of its maximum transmission at a design angle of incidence. Filter transmission as a function of wavelength at the design angle of incidence is shown as curve 602. The effective edge wavelength of such a dielectric filter is effectively shifted to shorter wavelengths at higher angles of incidence and to longer wavelengths for lower angles of incidence. As shown in FIG. 6, a short wavelength shifted spectrum of such a filter is indicated as a curve 604 that is associated with transmittance at an angle of incidence greater than the design angle of incidence (i.e., the angle of incidence associated with the curve 602). Thus, the edge filter is situated with respect to the unscanned beam so that the unscanned beam is substantially reflected (low transmission, curve 602) and the angle of incidence of the scanned beam is sufficient so that the scanned beam is substantially transmitted (curve 604). The FIG. 6 example is based on a long pass edge filter, but in other examples, short wavelength pass edge filters, notch filters, or other spectral filters can be used. In addition, the angle of incidence of either the scanned beam of the unscanned beam can be selected to be the larger angle of incidence. Because the spectral transmittance of a multilayer dielectric filter typically depends on SOP, retardation plates or other polarization control devices can be situated so that the scanned beam or the unscanned beam is in a preferred SOP.

Figure 5:
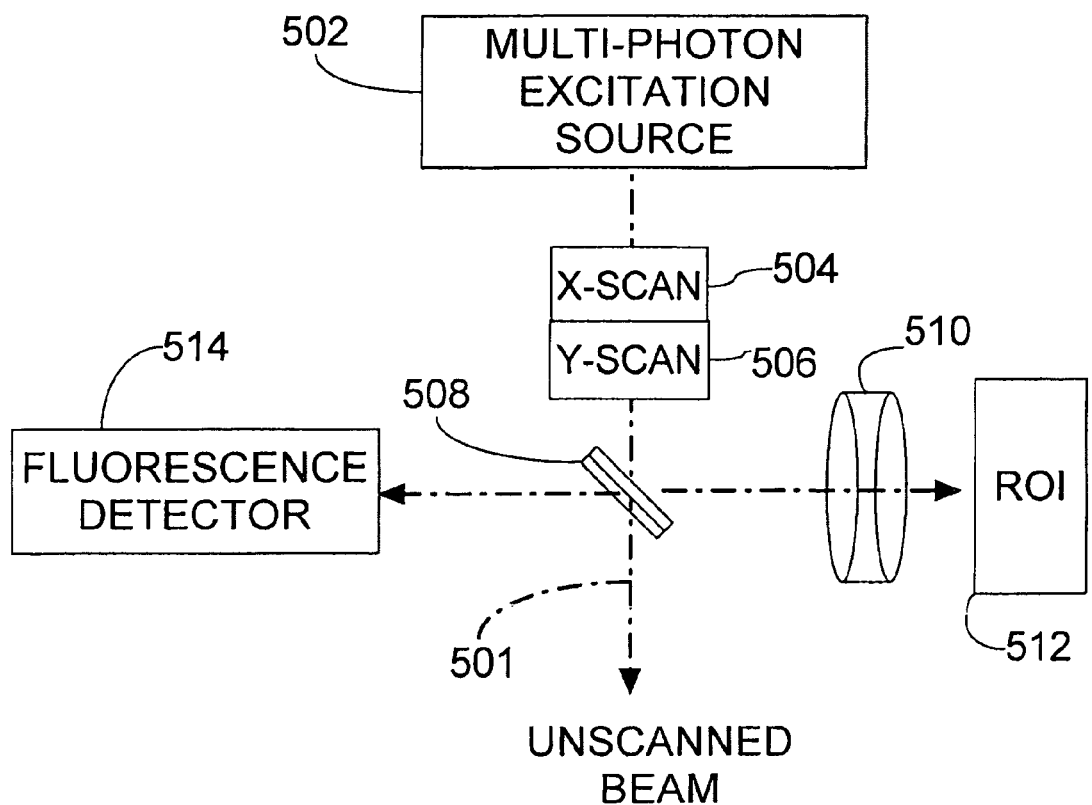

Referring again to FIG. 4, the beam separator 408 is typically situated so that the excitation beam is incident to the coating 408A and not the substrate 408B. The scanned beam is focused or otherwise directed to a specimen 412 by a lens or lens assembly 410. Fluorescence produced in response to the scanned excitation is collected by the lens 410 and reflected by the beam separator 408 to a fluorescence detector 414, In a further example shown schematically in FIG. 5, an excitation source 502 is situated to produce an excitation beam that is directed along an axis 501 to an X-scanner 504 and a Y-scanner 506. A beam separator 508 is situated so as to reflect a scanned beam to a lens 510 and to a region of interest (ROI) 512 of a specimen. Fluorescence produced in response to the scanned excitation beam is directed through the beam separator 508 and to a fluorescence detector 514.

Figure 8:
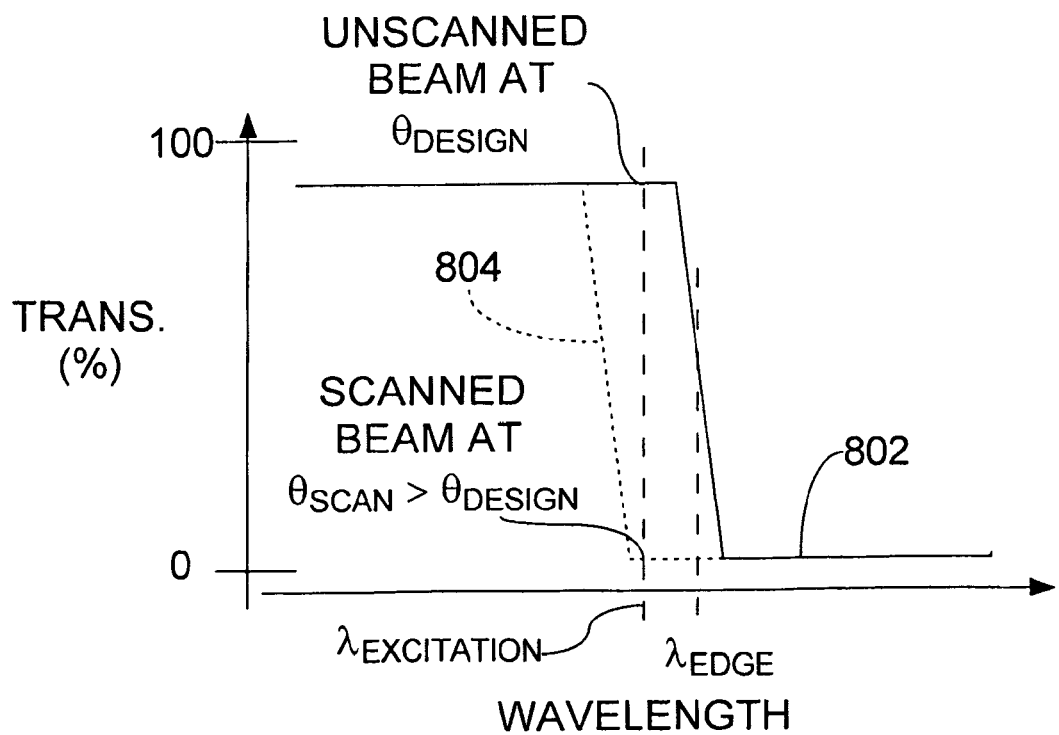
FIG. 8 is a graph of transmission as a function of wavelength for a short wavelength pass edge filter.

A transmission spectrum of a suitable filter for use as the beam separator 508 is illustrated in FIG. 8. In this example, the beam separator 508 is based on a short wavelength pass edge filter having an edge wavelength $\lambda_{EDGE}$ at which the transmission of the edge filter is about 50% of its maximum transmission at a design angle of incidence ($\theta_{DESIGN}$). Filter transmission as a function of wavelength at the design angle of incidence is shown as curve 802. The effective edge wavelength of such a dielectric filter is effectively shifted to shorter wavelengths at higher angles of incidence and lower wavelengths at lower angles of incidence. As shown in FIG. 8, a short wavelength shifted spectrum of such a filter is indicated as a curve 804 that is associated with transmittance at an angle of incidence greater than the design angle of incidence (i.e., the angle of incidence associated with the curve 802). Thus, the edge filter is situated with respect to the unscanned beam so that the unscanned beam is substantially transmitted (low reflectance, curve 802) and the angle of incidence of the scanned beam is sufficient so that the scanned beam is substantially reflected (curve 804). The FIG. 8 example is based on a short pass edge filter, but in other examples, long wavelength pass edge filters, notch filters, or other spectral filters can be used. In addition, the angle of incidence of either the scanned beam of the unscanned beam can be the larger angle of incidence. Because the spectral transmittance of a multilayer dielectric filter typically depends on SOP, retardation plates or other polarization control devices can be situated so that the scanned beam or the unscanned beam is in a preferred SOP.

Figure 7:
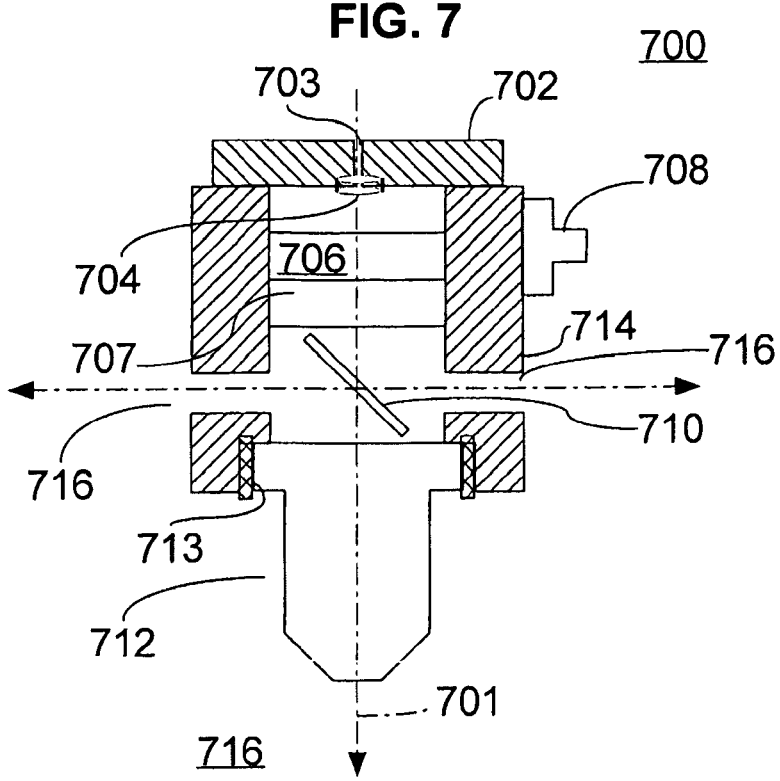
FIG. 7 is sectional view of a scanning head that includes a microscope objective.

One convenient implementation of a scanning system for single or multi-photon microscopy is illustrated in FIG. 7. A fiber coupler 702 secured to a microscope tube 714 that is configured to retain a one or two dimensional beam scanner 706. The fiber coupler 702 includes an aperture 703 configured to receive and align an optical fiber that delivers excitation optical radiation, and a collimating or other beam shaping lens 704 positioned so as to produce a suitable excitation beam for propagation along an axis 701. Typically the beam scanner 706 is an acousto-optic scanner and electrical scan signals are coupled to the beam scanner 706 via an electrical connector 708 that is secured to the microscope tube 714. A beam separator 710 is situated so as to reflect an unscanned portion of an input excitation beam and transmit a scanned beam to a microscope objective 712. A waveplate 707 can be provided and oriented to select a preferred SOP for incidence to the beam separator 710. For convenience, the microscope objective 712 can be secured to the microscope tube 714 with a threaded portion 713 typically provided for connection to a conventional microscope tube. The microscope tube 714 is provided with apertures 716, 718 situated to permit fluorescence to be reflected to a detector and to permit unscanned beam portions to be absorbed or otherwise captured or confined. In some examples, one or more fluorescence detectors such as single photodetectors or one or two dimensional array detectors are also secured to the scan tube along with suitable optical filters. In the example of FIG. 7, the beam separator 710 is based on a multilayer dichroic filter, but total internal reflection based separators can be used. Polarizers, filters, and other components can also be secured to the scan tube 704 as needed.

The scanning system of FIG. 7 can also include scan circuitry, one or more optical radiation detectors, and detector circuitry secured to the microscope tube 714. The connector 708 can be configured to supply power to the scanning system or for input/output. In some examples, batteries can be provided and secured to the microscope tube 714 and external power is unnecessary. Although the supporting structure for the system of FIG. 7 is referred to as a "tube" for convenience, as used herein a microscope tube is a mechanical support structure configured to secure a scanner, beam separator, and objective lens, and may be a tube of circular, elliptical, square, rectangular or other cross-section or a support of other shape or configuration. Such a support can be made of opaque or transparent materials, and can be formed of two or more parts configured to be secured to each other.

Figure 9:
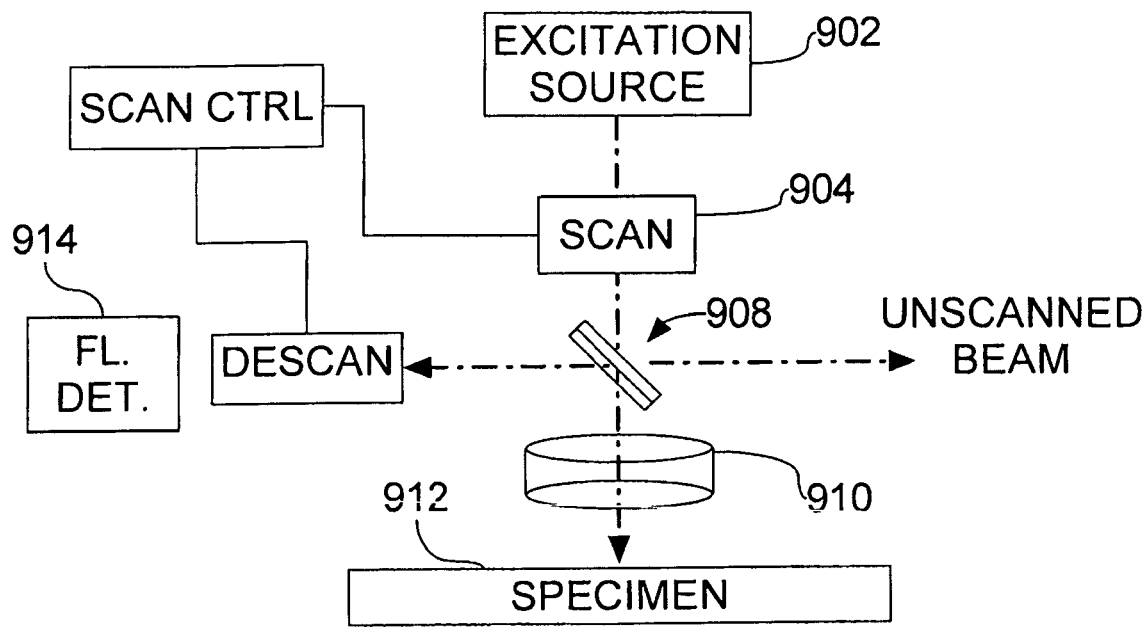
FIGS. 9-10 are schematic diagrams of exemplary confocal scanning microscopes.
Figure 10:
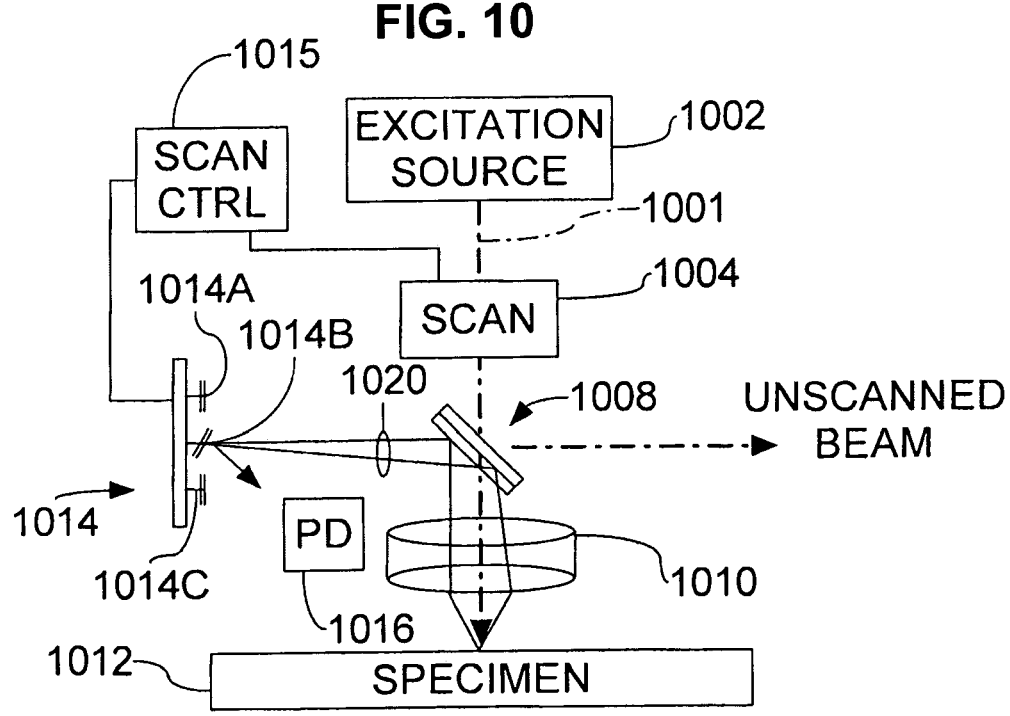

FIGS. 9-10 illustrate additional examples in which an additional scanner (FIG. 9) or a light valve (FIG. 10) are provided so that fluorescence (or other responsive optical radiation) from irradiated portions of the specimen is preferentially directed to a fluorescence detector. Such configurations can be referred to as confocal. In the example of FIG. 9, an excitation source 902 produces an excitation beam that is processed by a scanner 904 to produce a scanned beam. A beam selector 908 diverts an unscanned portion of the incident excitation beam, and a lens assembly 910 directs the scanned beam to a surface of a specimen 912. Fluorescence produced in response to the scanned beam is directed through the beam separator 908 to a scanner 910 that descans the fluorescence beam. The scanner 910 produces a scan angle so that fluorescence associated with a currently irradiated portion of the specimen is directed to a detector 918. If needed, a beam separator such as those discussed above can be used to reject any unscanned portions of the fluorescence beam.

In the example of FIG. 10, a light valve is used to preferentially select scanned areas of a specimen. As shown in FIG. 10, an excitation source 1002 produces an excitation beam that is directed along an axis 1001 to a scanner 1004 and a beam separator 1008. An unscanned beam portion is reflected so that any portions thereof that reach a specimen 1012 are substantially attenuated. A scanned beam is directed by a lens 1010 to the specimen and is scan over a region of interest in response to a scan signal provided to the scanner 1004 by a scan controller 1015. Fluorescence produced in response to the excitation is directed by the lens 1010 and the beam separator 1008 to a light valve 1014 that contains a plurality of valve elements, three of which (1014A-1014C) are shown in FIG. 10. Generally, the valve elements are arranged as a two dimensional array. Convenient light valves for use in the FIG. 10 apparatus include display arrays such as liquid crystal display panels (valve elements based on electrically switchable liquid crystal areas) and digital mirror based display units (valve elements based on electrically tiltable micromirrors, shown in FIG. 10). Because the valve elements of such light valves are generally used to produce images, they are referred to herein as picture elements or pixels.

As shown in FIG. 10, fluorescence from a selected location (selected based on a scan angle determined by the electrical signal from the scan controller 1015) is directed to the valve element 1014B that is controlled by the scan controller 1015 so as to reflect the fluorescence to a photodetector 1016. Other valve elements are configured so that optical radiation received from other locations on the specimen is not directed to the photodetector 1016. Based on the electrical signal provided by the scan controller, the excitation beam can be scanned at the specimen, and fluorescence produced at corresponding areas can be preferentially detected. In this way, one, two, or three dimensional representations or images of a region of interest of the specimen 1012 can be produced. The light value performs aperture scanning associated with confocal microscopy in response to three dimensional beam scanning by the beam scanner. Uses of micromirrors are described in, for example, Bansal et al., "High-speed addressable confocal microscopy for functional imaging of cellular activity," J. Biomed. Opt. 11:034003 (May/June 2006) that is incorporated herein by reference.

Figure 11:
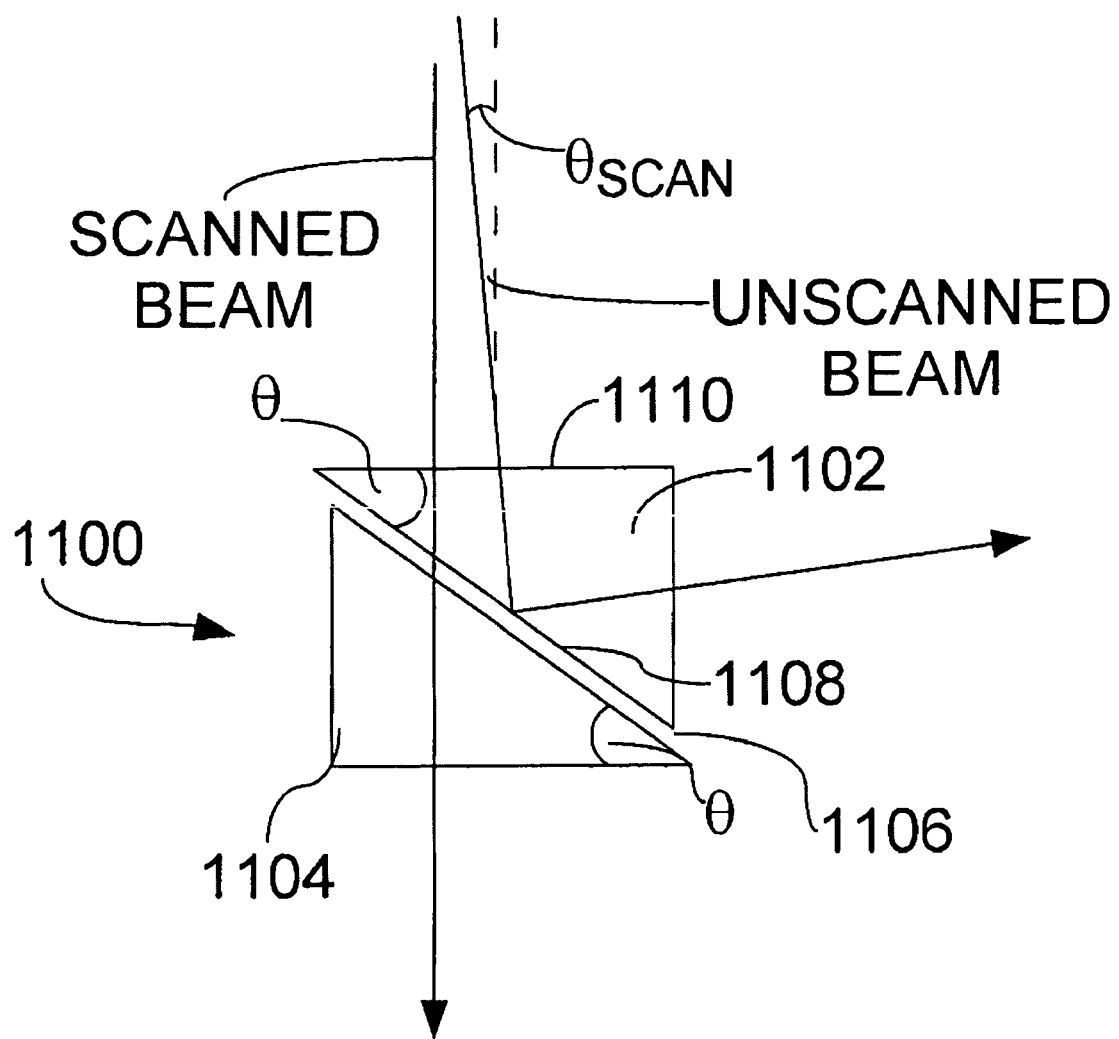
FIG. 11 is a schematic diagram of a beam separator based that includes two right angle prisms.

While a critical angle based beam separator can include two conventional isosceles right angle prisms that define an air gap, other prism configurations can be used. As shown in FIG. 11, a beam separator 1100 includes first and second prisms 1102, 1004, respectively that have a prism angle θ that is selected to be slightly less than the critical angle (i.e., $\sin^{-1}(1/n)$, wherein n is the prism index of refraction). The prisms 1102, 1004 are situated so as to define an air gap 1106 (or otherwise provide a refractive index discontinuity). As shown in FIG. 11, a scanned beam propagates at normal incidence to an input surface 1110 and is transmitted. An unscanned beam is incident to the input surface at an angle $\theta_{SCAN}$ so that the unscanned beam is totally internally reflected at a surface 1108. The prism angle can also be selected to be slightly larger than the critical angle, and the beam separator can be situated so that either the scanned beam or the unscanned beam is reflected. With the configuration of FIG. 11, the beam separator is not necessarily tilted with respect to the propagation direction of the scanned beam. In other examples, birefringent prisms such as Glan-Taylor prisms can be used so that critical angle is dependent on SOP.

Figure 12:
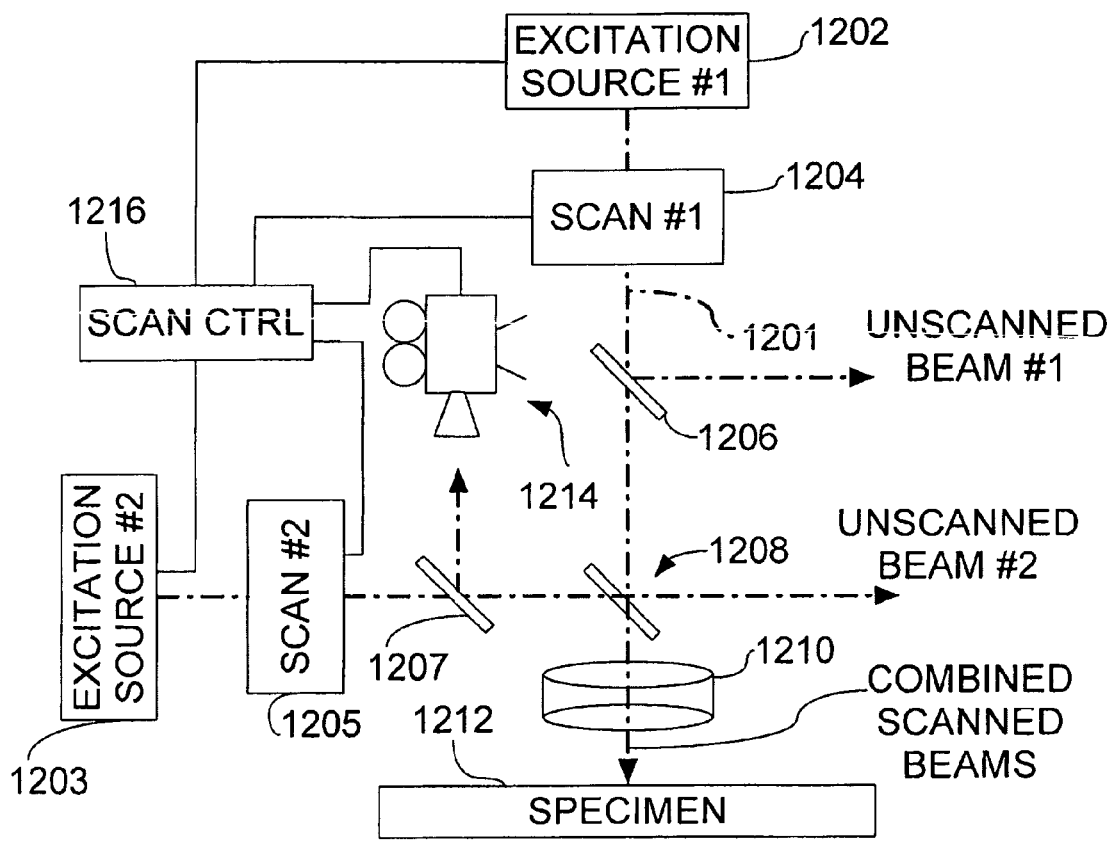
FIG. 12 is a schematic diagram of a laser scanning microscope that includes two excitation sources and associated scanners and beam separators.

With reference to FIG. 12, a representative dual beam scanning system includes first and second excitation sources 1202, 1203 that are configured to direct beams to acousto-optic scanners 1204, 1205, respectively. The scanned and unscanned beam portions of these beams are directed to respective beam separators 1206, 1207 so that the unscanned beam portions are directed away from a specimen 1212. A dichroic beam combiner 1208 receives the scanned beams and directs that scanned beams to an objective lens 1210 that is configured to irradiate a selected portion of the specimen 1212. Scattered, reflected, or emitted radiation is collected by the objective lens 1210, and directed by the beam combiner 1208 and the beam separator 1207 to a camera 1214. The scanners 1204, 1205, the camera 1214, and the excitation sources 1202, 1203 are coupled to a controller 1216 that coordinates operation so that image data or other data associated with specimen characteristics is collected, stored, and/or presented to a user. As shown in FIG. 12, one unscanned beam portion is reflected and one unscanned portion is transmitted to the specimen 1212, but other configurations can be used. Total internal reflection or dichroic coating based beam separators can be used.

Figure 13:
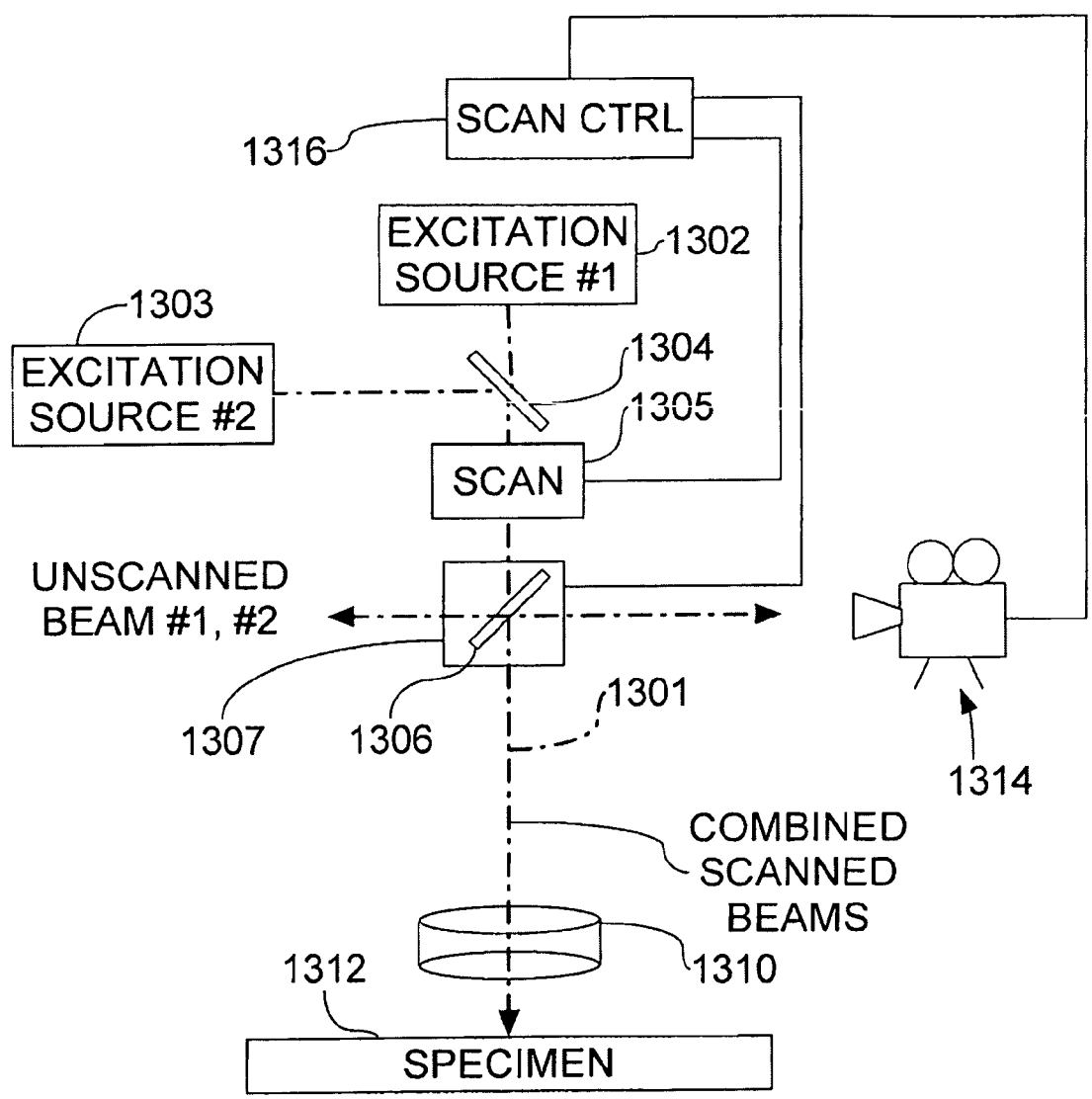
FIG. 13 is a schematic diagram of a laser scanning microscope that includes two excitation sources and a common scanner and beam separator.

In another example illustrated in FIG. 13, excitation sources 1302, 1303 produce respective excitation beams that are directed to a beam combiner 1304. The combined beams are then directed to a scanner 1305 and unscanned and scanned portions of the beams are separated by a beam separator 1306. The combined scanned beams are then directed through an objective 1310 to a specimen 1312. Reflected or scattered optical radiation or fluorescence generated in response to one or both of the scanned excitation beams can be collected by the objective 1310 and coupled to a camera 1314 or other detector by the beam separator 1306. The beam combiner 1305 (and/or the excitation sources 1302, 1303) can be situated so as to both be incident to the scanner 1304 at a suitable angle (the Bragg angle) for generation of respective scanned beams. The scanned beams cam be delivered simultaneously, alternately, or otherwise selectively delivered to the specimen 1312. The beam separator 1306 can be a total internal reflection based separator for which beam separation can be achieved for both excitation wavelengths without adjustment. If angular adjustment is needed, the beam separator 1306 can be secured to a stage 1307 that is rotatable and/or translatable. Interference filter-based beam separators can also be used with suitably selected spectral transmittance. Alternatively, two different filters (or a variable filter) can be provided, and scanned with the stage 1307 either manually or as directed by a scan controller 1316.

In some examples, excitation beams in a first wavelength range are used to generate optical radiation in a different wavelength range, typically for single or multi-photon fluorescence microscopy. However, such differences in wavelength range are not needed and scattered or reflected portions of excitation radiation can be detected. In one example, a detector is gated to detect ballistic photons generated at the specimen. In other examples, slightly scattered photons (snake photons), or multiply scattered photons can be detected.

The scanning systems described herein can be made both light and compact. In some examples, such systems can be used to excite channelrhodopsin transfected in a blind animal's cortex to as to produce a neuro-excitation corresponding to an image, and hence restore vision. Preferably, such scanning systems can be implanted or otherwise secured to the subject.

Figure 14:
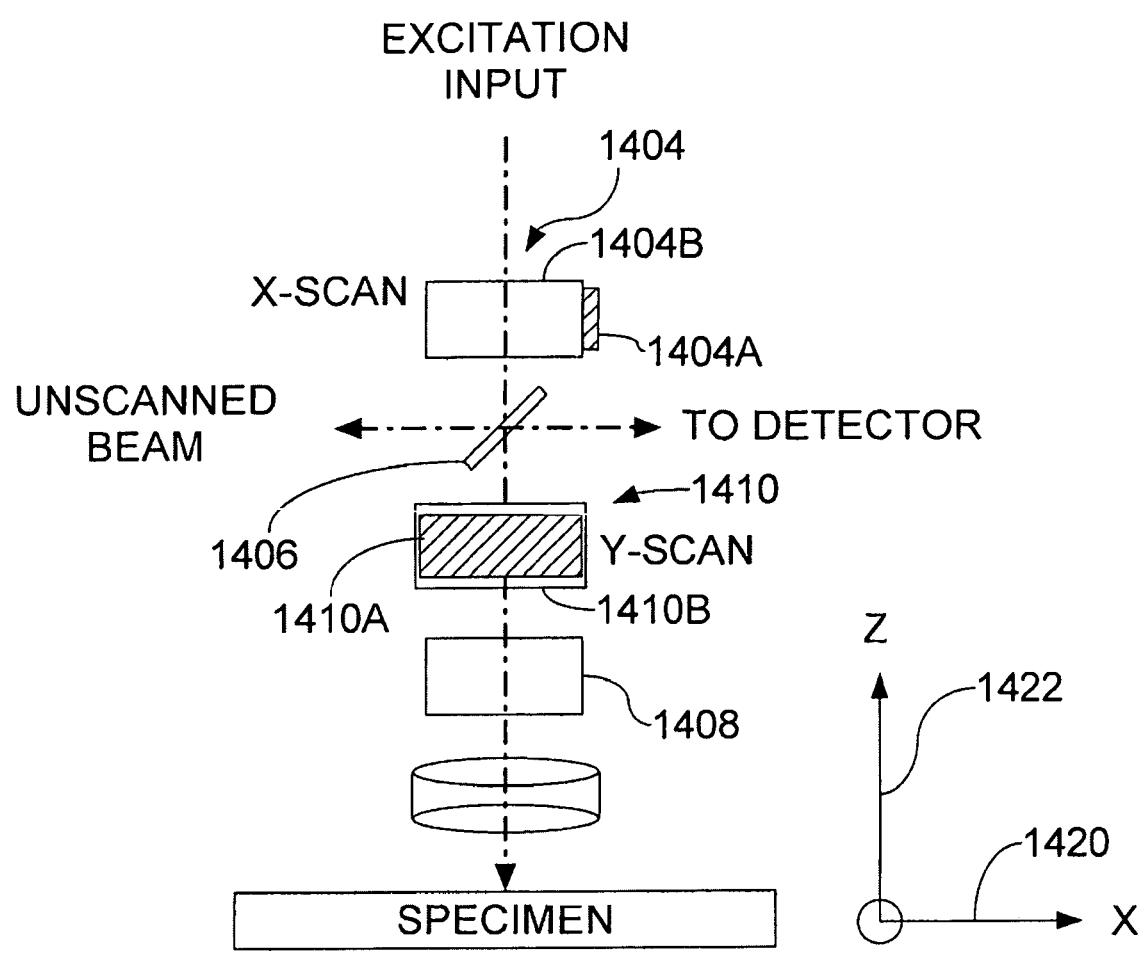
FIG. 14 is an elevational view of laser scanning microscope that includes separated X-axis and Y-axis scanners and associated beam separators.

Another representative example that includes separate X- and Y-axis scanners and corresponding beam separators is illustrated in FIG. 14 with respect to a coordinate system that includes an X-axis 1420, a Z-axis 1422, and a Y-axis directed into the drawing sheet. An X-scanner 1404 includes an acoustic transducer 1404A coupled to an acousto-optical medium 1404B. The transducer 1404A produces –X-directed acoustic waves in the medium 1404B so as to produce X-directed beam deflections. A first beam separator 1406 substantially diverts an unscanned beam portion. The X-scanned beam is directed to a Y-axis scanner 1410 that includes an acoustic transducer 1410A and an acousto-optic medium 1410B oriented to produce Y-axis directed beam deflections. A second beam separator 1408 substantially diverts beam portions that are transmitted by but are unscanned by the Y-axis scanner 1410. Waveplates, dispersion compensators, and other components that may be convenient are not shown in FIG. 14.

In view of the many possible embodiments to which the principles of the disclosed technology may be applied, it should be recognized that the illustrated embodiments are only preferred examples and should not be taken as limiting the scope of the technology. For example, beam selectors can be based on total internal reflection, multi-layer interference filter wavelength shifts as a function of angle of incidence, or polarizations of scanned and unscanned beams. Beam scanners can be electro-optic or acousto-optic or other types of scanners, and beam scanning and signal processing can be selected to produce one, two, or three dimensional images. Guided wave (for example, fiber optics) or free space optics can be used for delivery of excitation optical radiation to a beam scanner. Alternatively, laser diodes can be secured to a mounting assembly along with a beam scanner and beam separator. For systems that use wideband optical pulses (for example, femtosecond pulses or chirped pulses), angular dispersion in scanning produced due to Bragg angle dependence on optical frequency can be compensated or eliminated with an appropriately selected dispersive prism. Temporal dispersion can also be compensated, either alone or in combination with angular dispersion. In the disclosed examples, the scanned excitation beam is focused only at a specimen, and not at any intermediate locations (afocal systems), but in other examples, intermediate focused beam locations are defined. If an unscanned portions of an excitation optical beam has a suitably defined SOP that is different from that of the scanned beam, polarizing beam splitters or other polarization sensitive elements can be used to separate scanned and unscanned beams. We therefore claim as our invention all that comes within the scope and spirit of the appended claims.

We claim:

1. An apparatus, comprising:
   a beam scanner configured to receive an excitation optical beam and produce at least a scanned optical beam portion that is angularly deflected with respect to the excitation optical beam;
   a beam selector configured to substantially divert an unscanned portion of the excitation optical beam and direct the scanned portion of the excitation optical beam to the focusing element; and
   a focusing element situated to receive the scanned portion of the beam from the beam selector and converge the scanned portion of the beam at a predetermined specimen location,
   wherein the beam selector includes a dielectric filter situated so that the scanned optical beam portion is substantially reflected by the dielectric filter to the focusing element and the unscanned portion of the excitation optical beam is substantially transmitted by the dielectric filter.

2. The apparatus of claim 1, wherein the beam selector is configured to divert the unscanned portion of the excitation optical beam.

3. The apparatus of claim 1, wherein the beam selector includes an optical surface situated so that the scanned optical beam is incident to the optical surface at an angle greater than or equal to a critical angle and an unscanned portion of the excitation optical beam is incident to the optical surface at an angle less than the critical angle.

4. The apparatus of claim 3, wherein the beam selector comprises first and second right angle prisms situated so to from a beam splitter having an air gap between the first and second prisms.

5. The apparatus of claim 1, wherein the beam selector includes an optical surface situated so the scanned portion of the excitation optical beam is incident to the optical surface at an angle less than a critical angle and an unscanned portion of the excitation optical beam is incident at an angle of incidence greater than or equal to a critical angle.

6. The apparatus of claim 5, wherein the beam selector comprises first and second right angle prisms situated so as to form a beam splitter having an air gap between the first and second prisms.

7. The apparatus of claim 6, wherein the beam selector is a notch filter or an edge filter.

8. The apparatus of claim 1, wherein the beam selector includes a dielectric filter situated so that the scanned optical beam portion is substantially transmitted by the dielectric filter to the focusing element and the unscanned portion of the excitation optical beam is substantially reflected by the dielectric filter.

9. The apparatus of claim 1, wherein the beam scanner is an acousto-optic scanner.

10. The apparatus of claim 1, wherein the scanned beam is afocally delivered to the specimen.

11. The apparatus of claim 1, wherein the detector is configured to receive emitted optical radiation from the specimen in a wavelength range that is different than a wavelength range associated with the excitation optical radiation.

12. The apparatus of claim 1, further comprising a scanner driver coupled to the beam scanner and configured to angularly deflect the scanned beam in a range of scan angles.

13. The apparatus of claim 1, wherein the beam selector is situated so as to substantially transmit the scanned optical beam portion and reflect the unscanned portion of the excitation beam.

14. The apparatus of claim 1, wherein the beam scanner is configured to produce an angularly scanned beam that is scanned along at least two non-parallel axes.

15. The apparatus of claim 1, wherein the beam selector is configured to direct the emitted optical radiation from the specimen to the detector.

16. A scanning microscope, comprising:
  a beam scanner configured to receive an excitation optical flux and produce a scanned optical beam, wherein the scanned beam is scanned along at least one axis;
  an objective lens configured to direct the scanned optical beam to a specimen;
  a detector configured to receive optical radiation from the specimen and responsive to the scanned optical beam in a wavelength range different than that of the excitation optical flux; and
  a display controller configured to provide an image representation based on an electrical received from the detector that is responsive to the received optical radiation in the different wavelength range,
  wherein the beam selector includes a dielectric filter situated so as to separate the scanned beam and the unscanned portion of the excitation beam based on angles of incidence of the scanned beam and the unscanned portion.

17. The scanning microscope of claim 16, wherein the detector is an array detector.

18. The scanning microscope of claim 16, further comprising a scanning tube configured to retain the beam scanner and the objective lens.

19. The scanning microscope of claim 18, wherein the objective lens is a microscope objective and the scanning tube includes a threaded portion configured for attachment of the microscope objective.

20. The scanning microscope of claim 19, further comprising a beam selector configured to direct the scanned beam to the objective lens and substantially divert an unscanned portion of the excitation optical beam from the objective lens.

21. The scanning microscope of claim 20, wherein the beam selector includes an optical interface situated so that the scanned beam and the unscanned portion of the excitation beam are separated by total internal reflection.

22. The scanning microscope of claim 20, wherein the beam scanner is situated proximate the objective lens.

23. In an optical scanner, a method, comprising:
  producing a scanned beam portion from an excitation optical beam;
  afocally separating the scanned beam portion and an unscanned portion of the excitation optical beam, wherein the scanned beam and the unscanned beam portion are directed to a multiplayer dielectric filter at respective angles of incidence so as to separate the scanned beam and the unscanned beam portion;
  delivering the scanned beam portion to a specimen; and
  in a processor, producing an image signal based on optical radiation produced in response to the scanned beam portion.

24. The method of claim 23, wherein the scanned beam and the unscanned beam portions are separated by total internal reflection of one of the scanned beam and the unscanned beam.

25. The method of claim 24, wherein the scanned beam portion is separated by total internal reflection.

26. The method of claim 24, wherein the unscanned beam portion is separated by total internal reflection.

* * * * *